US006973505B1

(12) United States Patent
Schneider

(10) Patent No.: US 6,973,505 B1
(45) Date of Patent: *Dec. 6, 2005

(54) NETWORK RESOURCE ACCESS METHOD, PRODUCT, AND APPARATUS

(76) Inventor: Eric Schneider, 13944 Cedar Rd. #258, University Hts., OH (US) 44118

( * ) Notice: Subject to any disclaimer, the term of this patent is extended or adjusted under 35 U.S.C. 154(b) by 782 days.

This patent is subject to a terminal disclaimer.

(21) Appl. No.: 09/644,587

(22) Filed: Aug. 23, 2000

Related U.S. Application Data

(60) Provisional application No. 60/153,594, filed on Sep. 13, 1999, provisional application No. 60/152,015, filed on Sep. 1, 1999.

(51) Int. Cl.[7] .............................................. G06F 15/16
(52) U.S. Cl. ........................ 709/245; 709/223; 709/228
(58) Field of Search ............................... 709/245, 246, 709/244, 203, 227, 228, 226, 223; 705/14; 707/10; 703/313; 715/501.1

(56) References Cited

U.S. PATENT DOCUMENTS

| 5,649,186 | A | * | 7/1997 | Ferguson | 707/10 |
| 5,890,172 | A | * | 3/1999 | Borman et al. | 715/501.1 |
| 5,907,680 | A | * | 5/1999 | Nielsen | 709/228 |
| 5,913,215 | A | * | 6/1999 | Rubinstein et al. | 707/10 |
| 5,999,912 | A | * | 12/1999 | Wodarz et al. | 705/14 |
| 6,006,264 | A | * | 12/1999 | Colby et al. | 709/226 |
| 6,009,459 | A | * | 12/1999 | Belfiore et al. | 709/203 |
| 6,128,623 | A | * | 10/2000 | Mattis et al. | 707/103 R |
| 6,338,082 | B1 | | 1/2002 | Schneider | 709/203 |
| 6,363,433 | B1 | * | 3/2002 | Nakajima | 709/313 |
| 6,560,634 | B1 | * | 5/2003 | Broadhurst | 709/203 |
| 6,678,717 | B1 | | 1/2004 | Schneider | 709/203 |
| 2002/0156800 | A1 | * | 10/2002 | Ong | 707/203 |

OTHER PUBLICATIONS

Network Working Group, Uniform Resource Identifiers (URI): General Syntax by T. Berners-Lee et al, Aug. 1998.*
Network Working Group, Uniform Resource Identifiers (URI): General Syntax by T. Berners-Lee et al, Aug. 1998.*

* cited by examiner

*Primary Examiner*—Hosain Alam
*Assistant Examiner*—Benjamin Bruckart

(57) ABSTRACT

When a user retrieves a web page from a network and it is determined that the web page can be accessed from the network with a resource location request including a Uniform Resource Identifier (URI) having one or more URI components, one or more domain names can be generated from at least one of a one or more URI components and at least a portion of the web page, and the user can be provided a copy of the web page from the network along with the ability to determine whether at least one domain name of said one or more domain names is available for registration.

20 Claims, 10 Drawing Sheets

NETWORK RESOURCE ACCESS METHOD, PRODUCT, AND APPARATUS

CROSS REFERENCE TO RELATED APPLICATIONS

The application for patent claims priority of U.S. Provisional Application Ser. No. 60/153,594 filed Sep. 13, 1999, by Schneider and U.S. Provisional Application Ser. No. 60/152,015 filed Sep. 1, 1999, by Schneider, et al., which are hereby incorporated by reference.

The application for patent is also related to co-pending applications and claims the benefit of U.S. patent application Ser. No. 09/643,584 filed Aug. 22, 2000, by Schneider, et al., U.S. patent application Ser. No. 09/598,134 filed Jun. 21, 2000, by Schneider, and U.S. patent application Ser. No. 09/532,500 filed Mar. 21, 2000, by Schneider, which are hereby incorporated by reference.

FIELD OF THE INVENTION

This invention generally relates selecting online advertisements, and more specifically relates to a method, product, and apparatus for using a URI component to select and provide advertising, search terms, and available identifiers.

BACKGROUND OF THE INVENTION

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which may be used as a query to access a database server and generate an HTML web page with customized data results as output that is passed back to the client browser for display.

The Web is a means of accessing information on the Internet that allows a user to "surf the web" and navigate Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is available on a wide range of computer platforms including PC's.

A Uniform Resource Identifier (URI) is a compact string of characters for identifying an abstract or physical resource. URIs, is the generic set of all names and addresses that refer to objects on the Internet. URIs that refer to objects accessed with existing protocols are known as URLs. A URL is the address of a file accessible on the Internet. The URL contains the name of the protocol required to access the resource, a domain name, Fully Qualified Domain Name (FQDN), or IP address that identifies a specific computer on the Internet, and a hierarchical description of a file location on the computer. In addition, the last (optional) part of the URL may be a "?" followed by a query string having name/value pairs for parameters (e.g. "?size=small&quantity=3") or a "#" followed by a fragment identifier indicating a particular position within the specified document.

The URI "http://www.example.com:80/index.html#appendix" is the concatenation of several components where "http:" is the scheme or protocol, "//www.example.com" is the FQDN having "www" as the host of the domain name "example.com", ":80" is the port connection for the HTTP server request, "index.html" is the filename located on the server, "#appendix" is the identifier to display a fragment of the HTML file called "index". The URL "http://www.example.com" also retrieves an HTML file called "index" on a HTTP server called "example.com". By default, when either a port or filename is omitted upon accessing a HTTP server via a URL, the client browser interprets the request by connecting via port 80, and retrieving the HTML file called "index".

A domain name consists of two parts: a host and a domain. Technically, the letters to the right of the "dot" (e.g., tut.net) are referred to as Top Level Domains (TLDs), while hosts, computers with assigned IP addresses that are listed in specific TLD registries are known as second-level domains (SLDs). For the domain name "tut.net", ".net" is the TLD, and "tut" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "king.tut.net", are subsidiary to TLDs in the hierarchy of the Internet's DNS.

URLs are used in media and written in documents or typed within e-mail, and data files, etc. as a means to make reference to online content that helps express the context of the ideas one wishes to communicate. URLs are generally written in an abbreviated manner as partial URLs or domain names (e.g., "http://www.example.com" is the URL, "www.example.com" is the FQDN, and "example.com" is the domain name). During the early stages of commercialization on the Internet, businesses displayed the full URL when advertising a commercial or display ad as a means to locate such resources on the Internet.

Improvements have been made to recognize partial URLs when entered in the location field of a web browser or network accessible device for automatically appending protocol information so a full URL request can be made. By submitting a domain name or FQDN in the location field, the browser modifies the request by adjusting the partial URL and adding "http://" in front of the domain name or FQDN in order to construct a valid URL. As a result of this convenience, companies have modified their advertising and distribution of URLs through print, film, radio, television and other media as "example.com" or "www.example.com" instead of the URL "http://www.example.com". Though a helpful mnemonic for consumers to more readily identify and access the location and origin of goods and services on a public network such as the Internet, the mnemonic is only applicable when using a command line of a device or location field of a web browser program as a means to access the advertised web site.

U.S. Provisional Application Ser. No. 60/143,859 filed Jul. 15, 1999, by Schneider entitled "Method and apparatus for generation, registration, resolution, and emulation of name space", now abandoned, uses a domain name having a top level domain alias (TLDA) to simultaneously access and search a given resource demonstrating the combination of both resolution and search services. For instance, when input is received and processed such as "http://example.44106", steps are performed to determine that ".44106" is not a resolvable TLD and may be processed instead as a search term. Steps may then be performed to translate input into a valid URI such as "http://example.com/weather.cgi?zip=44106". When the URI is accessed, a CGI script called "weather" is executed passing the value "44106" for the name "zip", which in this case represents a zip code. By so doing a fictitious name may be used to simultaneously access both a resource and search request.

U.S. Provisional Application Ser. No. 60/152,015 filed Sep. 1, 1999, by Schneider, et al., entitled "Method and apparatus for using a portion of a URI as a search request." generates a shorter URI on the fly as a substitute for longer URIs that reflect the results of queries or search requests. For instance, when "http://update.to/news" is received as input it may be determined that no such URI exists and, in response, create the URI on the fly as a means to access content from a longer URI such as:

"http://update.to/cgi-bin/update.cgi?search=news".

This clearly demonstrates the need for methods of encouraging the creative use of URIs to access resources. Accordingly, in light of the above, there is a strong need in the art for a system and method to improve how resources and content including advertising, search terms, and available identifiers may be accessed.

SUMMARY OF THE INVENTION

Briefly, the present invention allows portions of a URI to be used as a search request for advertising selection. The invention allows for coupons, rebates, offers and advertising to de displayed or printed in response to keywords extracted from a URI or meta content corresponding with the page source of such a URI. The present invention displays keywords extracted from Meta or Title information to assist a user or subscriber with search terms to help form a query or search request. The invention also displays available identifiers such as domain names in addition to the displayed search terms. The present invention allows for keywords used as a search request to be further used as path names to generate a shorter URI on the fly in real time rather than displaying such search results from a longer URI. The invention further uses extracted keywords to display advertising that represents competition to the received URI. The present invention reduces the extra steps of remembering or typing and possibly misspelling a recipient address, by combining the functions of sending e-mail by only typing in a URI. The invention enables the user to combine Boolean logic with valid URI notation to generate a search request from the URI or vice-versa.

In general, in accordance with the present invention a method for locating a network resource from a first identifier having a valid accessible first URI includes the steps of parsing at least one URI component from the first URI, selecting a first content corresponding to said at least one URI component of the first URI, generating a valid accessible second URI that accesses said first content, and accessing the first URI and said second URI.

In accordance with another aspect of the present invention a method for processing a search request having at least one keyword, wherein the search results of the search request is accessed from an accessible first URI having a query component that corresponds to the at least one keyword includes the steps of generating a second URI having a default file that accesses the first URI and a non-query component that corresponds to the at least one keyword, and accessing said second URI.

In accordance with yet another aspect of the present invention a method for sending a message to an e-mail address includes the steps of accessing an accessible first URI, wherein said first URI is not an e-mail address, submitting the message to be sent from said first URI, generating the e-mail address from said first URI in response to submitting the message, and sending the message to the generated e-mail address.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

Figure 1A:
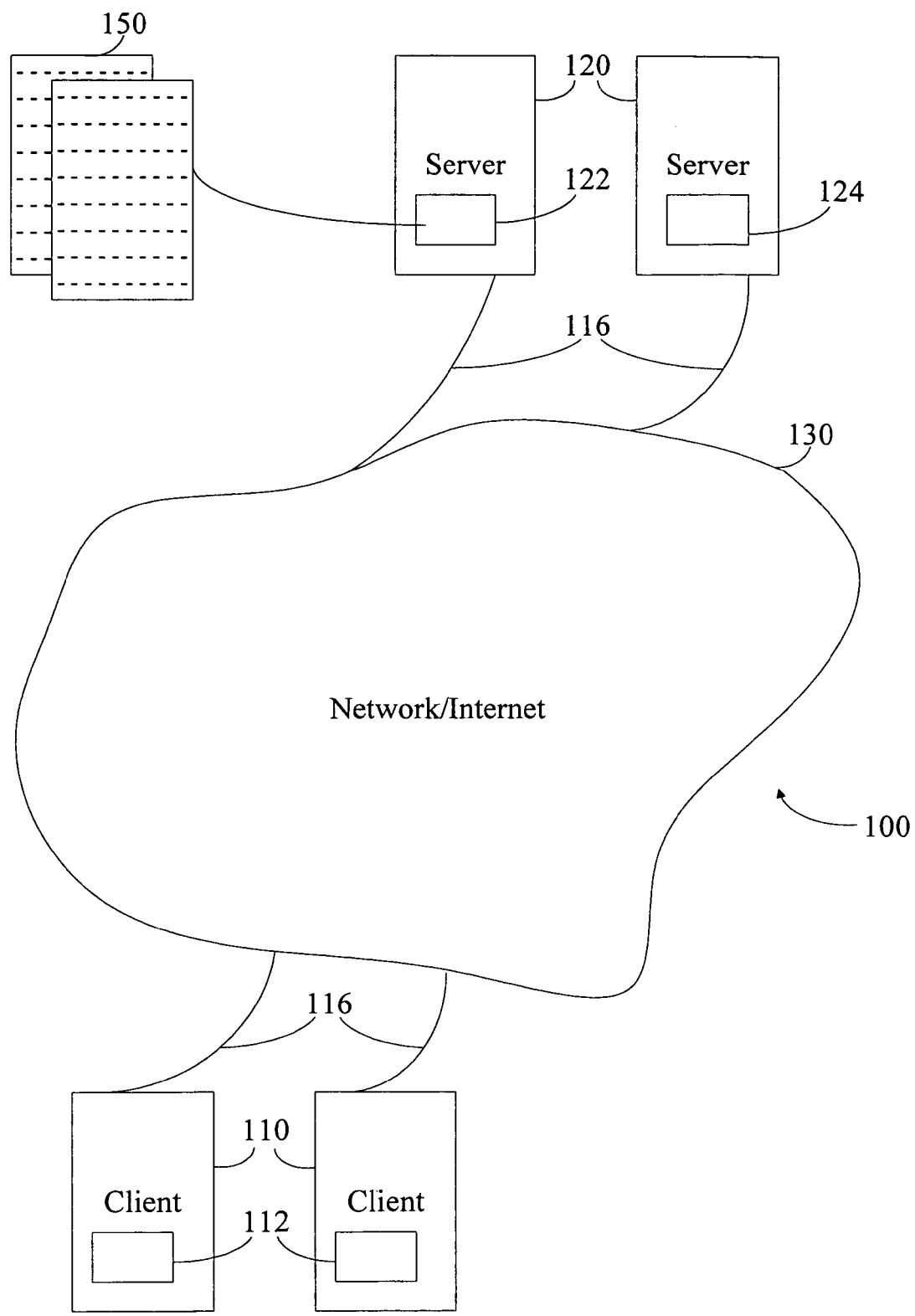
FIG. 1a is a block diagram of an exemplary distributed computer system in accordance with the present invention.

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1a illustrates an exemplary system for providing a distributed computer system 100 in accordance with one aspect of the present invention and may include client computers or any network access apparatus 110 connected to server computers 120 via a network 130. The network 130 may use Internet communications protocols (IP) to allow clients 110 to communicate with servers 120. The network access apparatus 110 may include a modem or like transceiver to communicate with the electronic network 130. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors 166, memories 168, and input/output devices 170. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touch-screen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
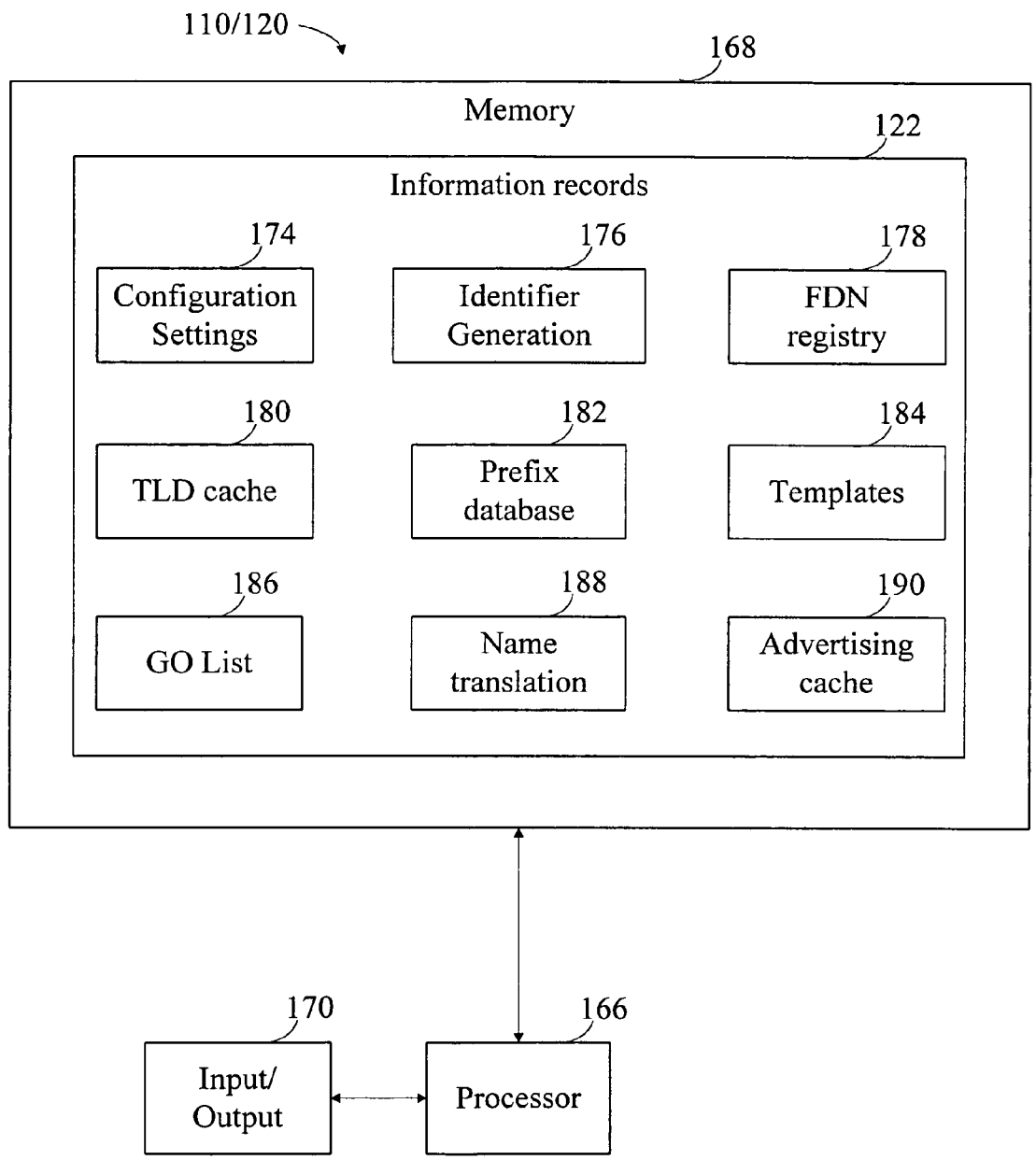
FIG. 1b is a block diagram illustrating exemplary information records stored in memory in accordance with the present invention.

FIG. 1b illustrates a block diagram of a processor 166 coupled to a storage device such as memory 168 and to input/output devices 170 in a client 110 and/or server 120 computing system. Stored in memory 168 may be information records 122 having any combination of exemplary content such as lists, files, and databases. Such records may include for example: user modifiable configuration settings 174, identifier generation routines 176, FDN registry 178, TLD cache 180, prefix database 182, Templates 184, GO List 186, name translation table 188, and advertising cache 190. These information records may be further introduced and discussed in more detail throughout the disclosure of this invention.

Figure 2:
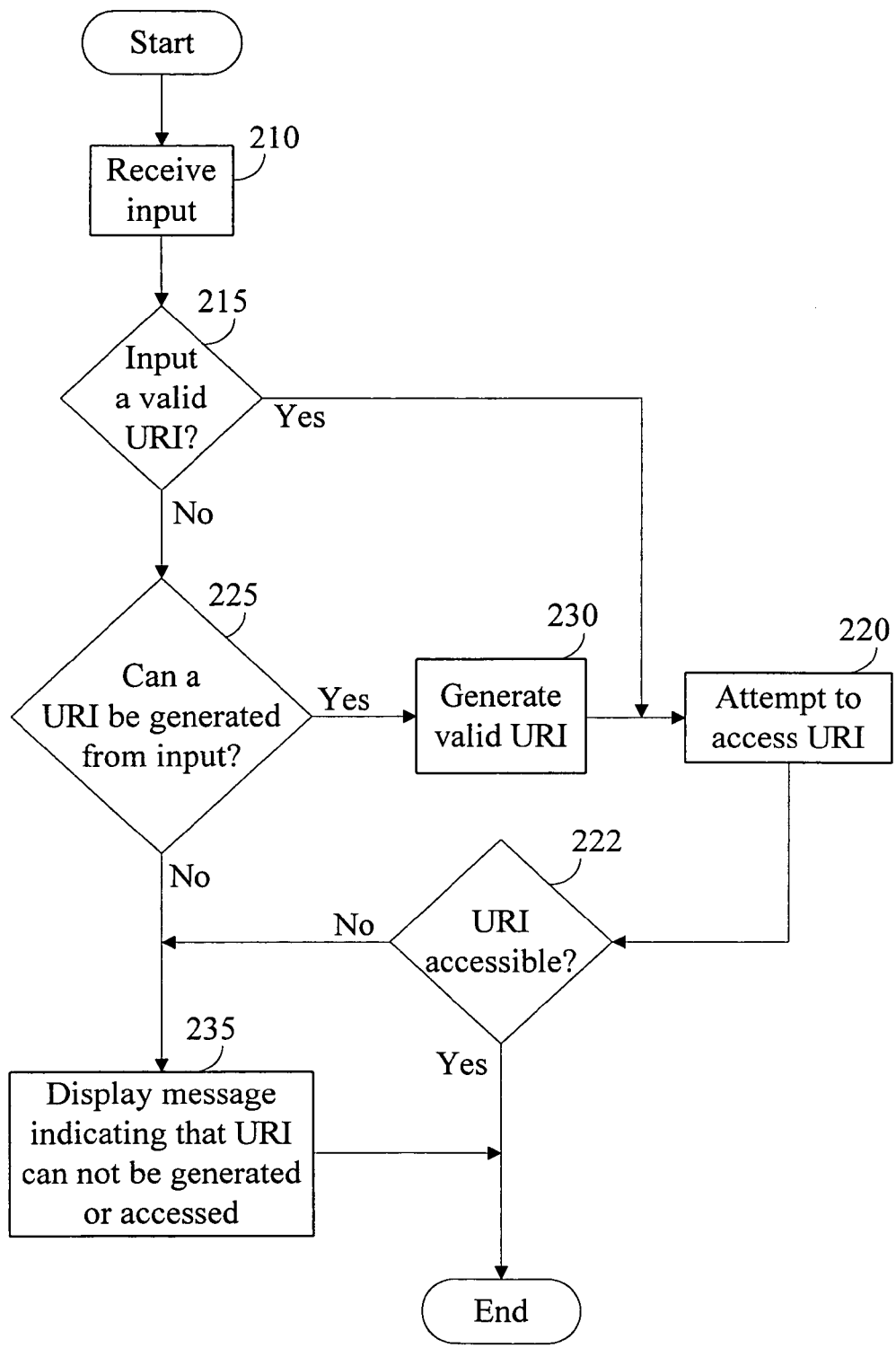
FIG. 2 is a flowchart illustrating the steps performed by a prior art system for accessing a URI.

FIG. 2 is a flowchart illustrating the steps performed by a prior art system for locating a network resource from an identifier by accessing a URI. A device such as a network access apparatus 110, servlet, applet, stand-alone executable program, or user interface element such as a text box object, command line, speech to text interface, location field 814 of a web browser 112, may receive and parse input such as text or voice in step 210. It then may be determined in step 215 whether the input 210 is a URI. If the input is a URI, then an attempt may be made in step 220 to access the URI. The URI may be accessed when it is determined in step 222 that the URI is accessible. If the input is not a URI, then it may be determined in step 225 whether a URI can be generated from the input (e.g., if a scheme is missing the prefix "http://" or another scheme prefix may be concatenated to input). If so, then a URI is generated 230 and an attempt may be made in step 220 to access the URI. If the URI can not be generated or accessed, then a message indicating that the URI can not be generated or accessed may be displayed in step 235.

Figure 3:
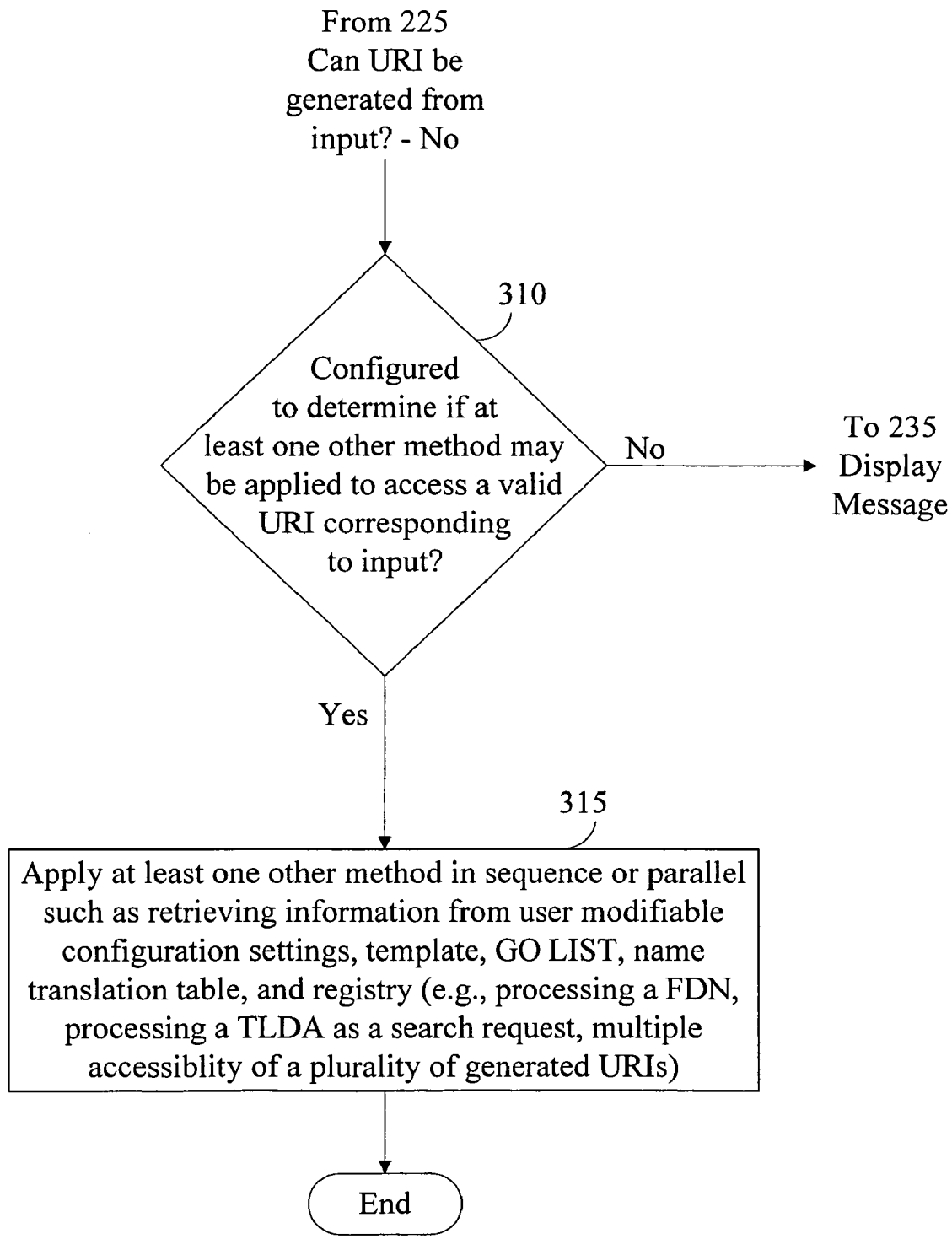
FIG. 3 is a flowchart illustrating the steps performed for generating a valid URI in accordance with the present invention.

FIG. 3 is a flowchart illustrating the steps performed for generating a valid URI. When it is determined in step 225 that a URI can not be generated from the input 210 in accordance with methods known to one of ordinary skill in the art, then it may be determined in step 310 whether it is configured to determine whether other methods may be applied to access a valid URI corresponding to input. If configuration 174 is not enabled, then a message indicating that the URI can not be generated may be displayed in step 235. However, when configuration is enabled, then at least one other method may be applied in step 315 in sequence or parallel including methods explained in U.S. patent application Ser. No. 09/532,500 filed Mar. 21, 2000, by Schneider, entitled "Fictitious domain name method, product, and apparatus" such as retrieving information from user modifiable configuration settings 174, template 184, GO LIST 186, name translation table 188, and registry 178 (e.g., processing a FDN, processing a TLDA as a search request, and multiple accessibility from a plurality of generated URIs, etc.).

Figure 4:
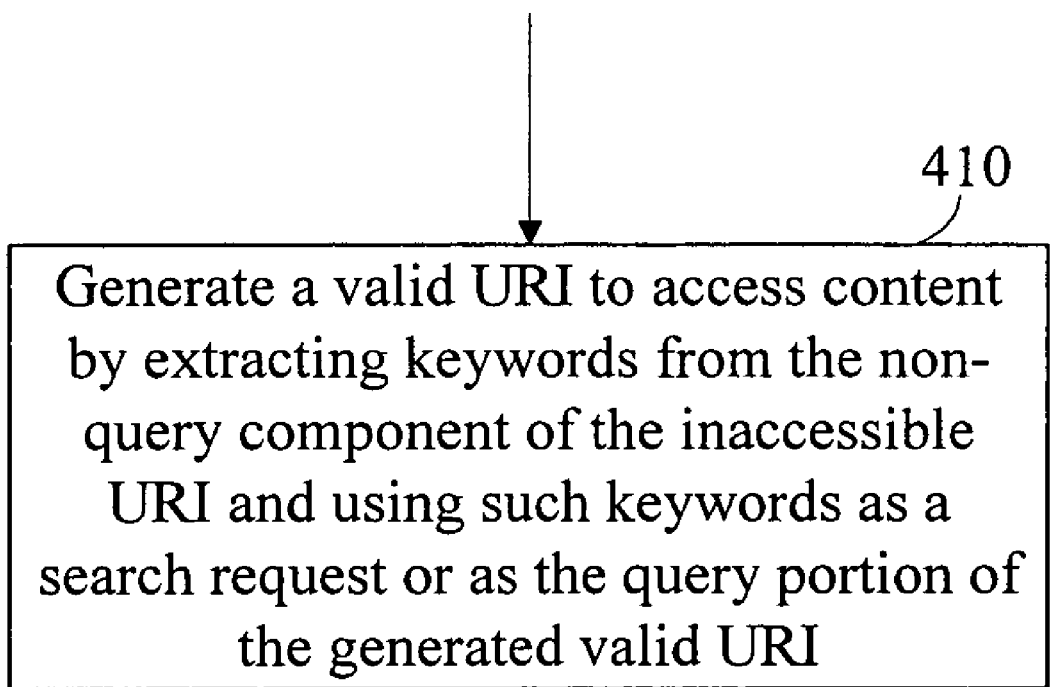
FIG. 4 is a flowchart illustrating the steps performed for generating a valid URI in response to determining that an existing valid URI is inaccessible in accordance with the present invention.

FIG. 4 is a flowchart illustrating the steps performed for generating a valid URI in response to determining that an existing valid URI is inaccessible. When a valid URI is determined in step 222 to be not accessible, then a valid URI may be generated in step 410 to access content by extracting identifiers such as keywords from the non-query component URI (e.g., directory, domain, port, or fragment, etc.) of the inaccessible URI and using such keywords or search terms as a search request or as the query portion of the generated valid URI. After valid URI generation in step 410 an attempt may be made in step 220 to access the URI.

Figure 5A:
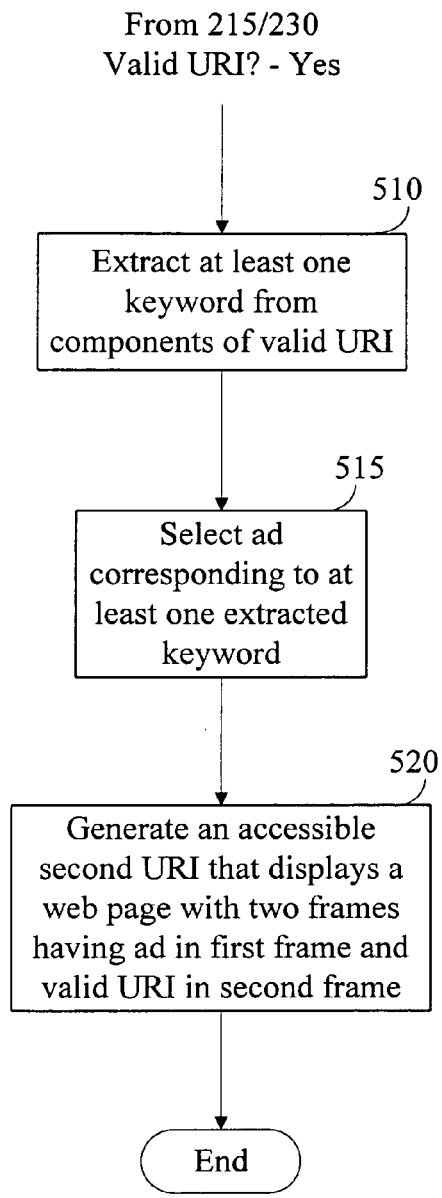
FIG. 5a is a flowchart illustrating the steps performed for generating an accessible second URI that retrieves an advertisement corresponding to components of a first URI in accordance with the present invention.

FIG. 5a is a flowchart illustrating the steps performed for generating an accessible second URI that retrieves an advertisement corresponding to components of a first URI. Upon receiving or generating a valid first URI (step 215 or 230), a script may be executed in step 510 to extract at least one keyword from any URI components and select in step 515 an advertisement from an advertising cache 190 that may correspond to any extracted keywords and/or to other identifiers that are similar to such extracted keywords. An accessible second URI may be generated in step 520 that provides, renders, and/or displays a web page having two frames. The first frame may access the selected ad and the second frame may access the first valid URI.

U.S. Provisional Application Ser. No. 60/143,859 filed Jul. 15, 1999, by Schneider entitled "Method and apparatus for generation, registration, resolution, and emulation of name space", now abandoned, explains how URI components such as scheme, hostname, TLD, port, path, query, or fragment of a URI are regarded as data elements used for generating an accessible URI. All combinations for concatenating component data that does not form a full URI may be referred to as a Partial Uniform Resource Identifier (PURI). The same applies for Partial Uniform Resource Locators (PURLs) and other resource types.

For example, when the input "books.com" is received, the URI "http://books.com" is generated and URI components "http", "books", "com" may be extracted from the CGI script. The word "books" may be used to select an advertisement by consulting a table of advertisements and/or advertising cache 190 relating to the keyword "books". Many advertisers may compete for rotation frequency of their ad per group or category. When an ad is selected, an accessible URI may be generated and when accessed displays the advertisement and web based location field in one frame and display the content of the URI "http://books.com" in the second frame. Another example, is when a TLDA is received as input such as "top.stories". The URI "http://stories.top.com" may be generated based upon a selected access method (note that a variety of access methods may be used by the present invention to generate different accessible URIs if need be). Keywords extracted from URI are "stories" and "top". A phrase such as "top stories" and "stories top" may also be generated from URI components to more specifically target ad categories for advertisers.

Figure 5B:
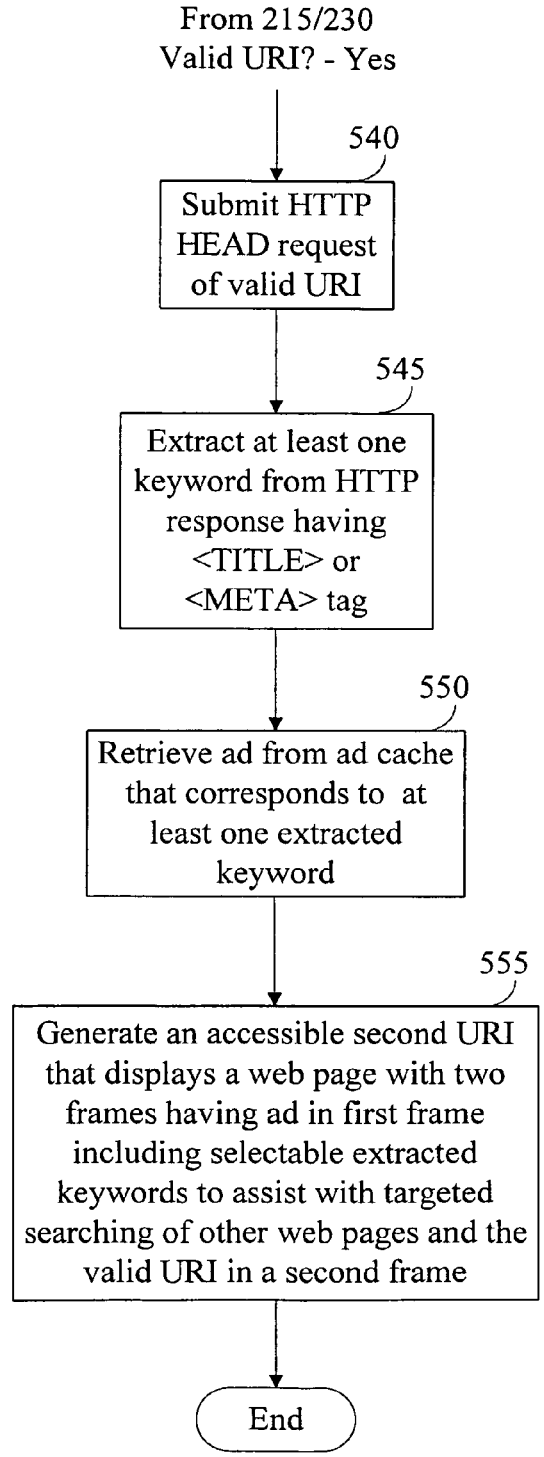
FIG. 5b is a flowchart illustrating the steps performed generating an accessible second URI that retrieves an advertisement corresponding advertisement to meta-information of a first URI in accordance with the present invention.

FIG. 5b is a flowchart illustrating the steps performed generating an accessible second URI that retrieves an advertisement corresponding advertisement to meta-information of a first URI. Upon receiving or generating a valid first URI (step 215 or 230), a script may be executed in step 540 to submit a HTTP HEAD request of the valid URI. When a HTTP response is received then at least one keyword may be extracted in step 545 from the response of the HEAD request from the <TITLE> and/or <META> tag of the target URI.

It may then be determined in step 550 which ad may be selected and retrieved from an ad cache 190 corresponding to at least one extracted keyword. After the ad has been selected, an accessible second URI may then be generated in step 555 that when accessed displays a web page with two frames. An ad may be accessed by the first frame including selectable keywords to assist the user in performing further targeted searching of other search requests, while accessing the first URI in the other frame.

For instance, before the content of URI "http://stories.top.com" may be displayed as a result of or input "top.stories", while a URI HEAD request further extracts keywords from the <META> tag or the <TITLE> tag from the URI to assist in yet more specific targeted ad rotation. In addition to "top" and "stories", words like "news", "headlines", "weather", "sports", for example, may be extracted from the <META> tag of the URI. These extra keywords may be used to better target ads and also provide suggested categories that may be dynamically generated on the web page for selection to find more content specific to the user. After words have been extracted, the keywords may be used to select an ad from an ad cache the may reside on the client machine and/or locally through an advertising cache 190 stored at the Internet Service Provider (ISP)/Application Service Provider (ASP) or the like. If an ad can not be selected based on this information then keywords may be passed to generate a URI having a query to further assist in ad selection.

The display of suggested search terms or keywords to assist a user in refining a search request is not limited by the components of the URI to extract <META> or <TITLE> tag information from the next web page before displaying the next page. Such keywords may also be selected from any accessed content and/or the page source of the URI. In addition, such keywords may be selected from any URI components. Another preferred implementation is based on a search page as a front end for search engines. To date there is no such program implemented to make use of any tagged language such as HTML, DHTML, XML, XHTML, and SGML to name a few that extracts META information of a subsequent page to be used for extending the range of navigation by concurrently displaying such META information separately from the web page when accessed.

Figure 5C:
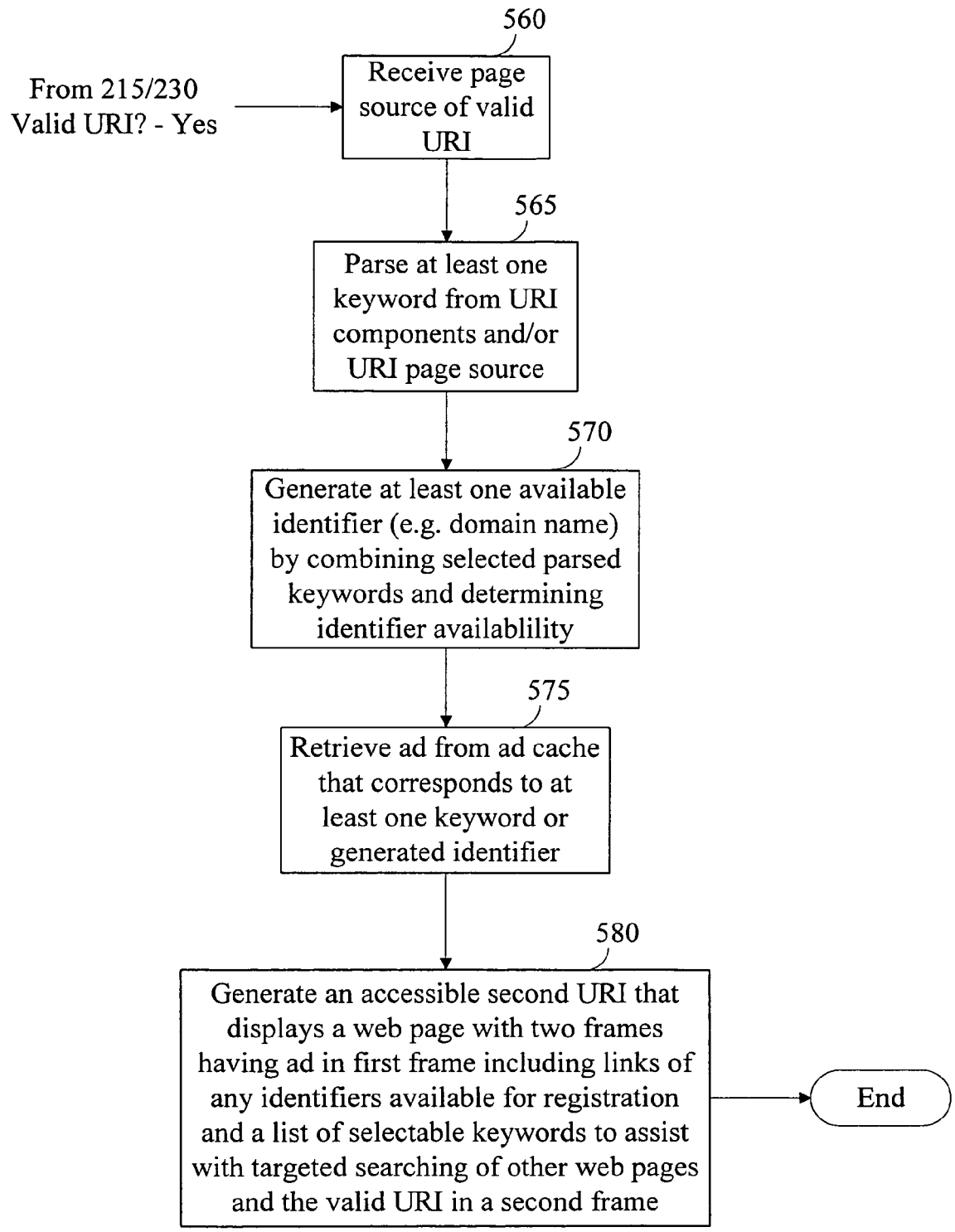
FIG. 5c is a flowchart illustrating the steps performed generating an accessible second URI that may access an advertisement, keywords, and available identifiers corresponding to a first URI in accordance with the present invention.

FIG. 5c is a flowchart illustrating the steps performed generating an accessible second URI that may access an advertisement, keywords, and available identifiers corresponding to a first URI. Upon receiving or generating a valid first URI (step 215 or 230), a script may be executed in step 560 to receive the page source of the first URI. Keywords may then be parsed in step 565 from URI components and/or the page source of the first URI. At least one available identifier (e.g. domain name) may be generated in step 570 by combining selected parsed keywords and determining identifier availability. U.S. patent application Ser. No. 09/598,134 filed Jun. 21, 2000, by Schneider, entitled "Method and apparatus for integrating resolution services, registration services, and search services", explains how identifiers such as domain names may be generated in response to receiving keywords. Combinations of keywords may be concatenated and a TLD added to form a domain name. All generated domain names may then be checked for availability.

Advertisements may be selected in step 575 by retrieving ads from an ad cache that corresponds to at least one keyword or generated identifier. After keyword extraction, identifier generation, and ad selection, an accessible second URI may be generated in step 580 that displays a web page with two frames having the selected ad in the first frame including links of any identifiers available for registration, and a list of selectable keywords to assist with targeted searching of other web pages, while the first URI is accessed in a second frame.

Figure 6:
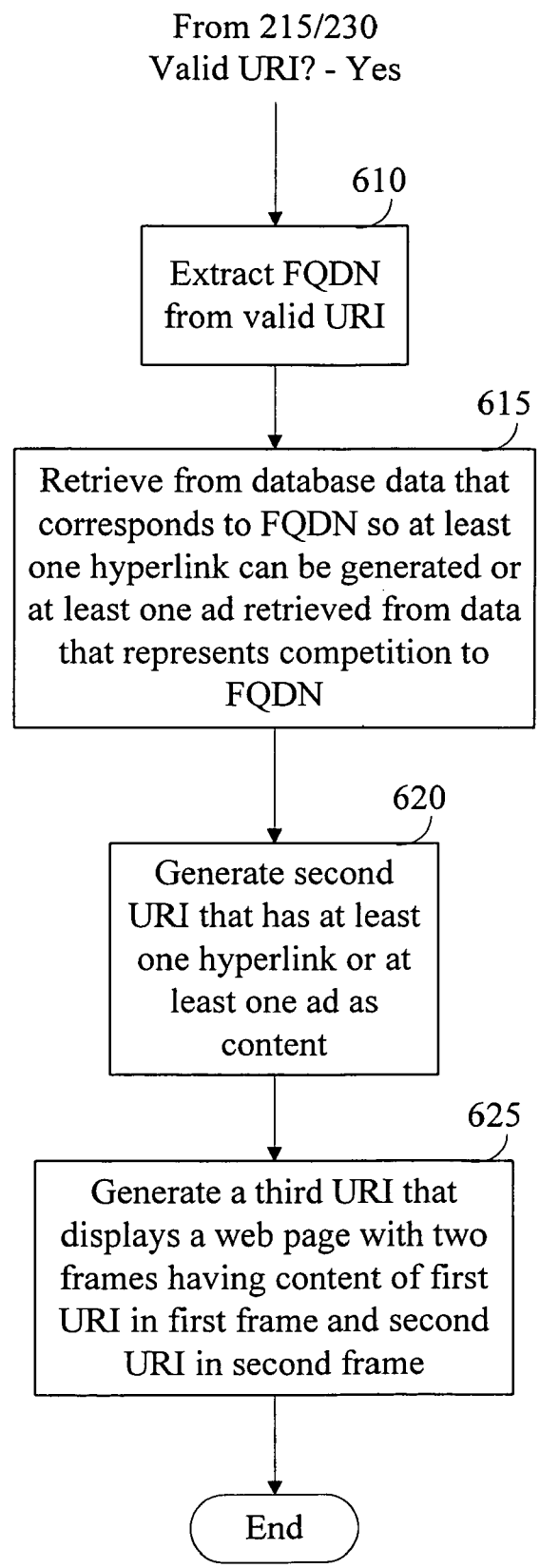
FIG. 6 is a flowchart illustrating the steps performed for extracting a domain or FQDN to determine hyperlinks or advertisements based on competition associated from a generated URI of received input in accordance with the present invention.

FIG. 6 is a flowchart illustrating the steps performed for extracting a domain or FQDN to determine hyperlinks or advertisements based on competition associated from a generated URI of received input. Upon receiving or generating a valid first URI (step 215 or 230), a script may be executed in step 610 to parse a FQDN from the valid URI. Data that corresponds to FQDN may be retrieved in step 615 from an ad database 190 so at least one hyperlink may be generated or at least one ad retrieved from data that represents competition to the FQDN. A second URI may be generated in step 620 that has at least one hyperlink or at least one ad as content. A third URI may be generated in step 625 that displays a web page with two frames having content of the valid URI in the first frame and the second URI in the second frame.

Ads may be targeted by displaying a combination of competitor ads and/or hyperlinks in response to receiving the domain name or FQDN of the URI as input. The selected advertisement may corresponds to competition of an entity that manages the URI. For instance, the URI generated from input is "http://www.burgerking.com" and "burgerking" is extracted and determines that a McDonalds ad, rebate, or coupon may be displayed in conjunction with displaying the "burgerking" website. Links to a "McDonalds" web site may also be provided. Inputting an identifier such as "burgerking.44106" may generate the URI "http://44106.burgerking-.com" and when "44106" is extracted from the identifier, Burger King locations near the zip code "44106" may be displayed in conjunction with the website.

Figure 7:
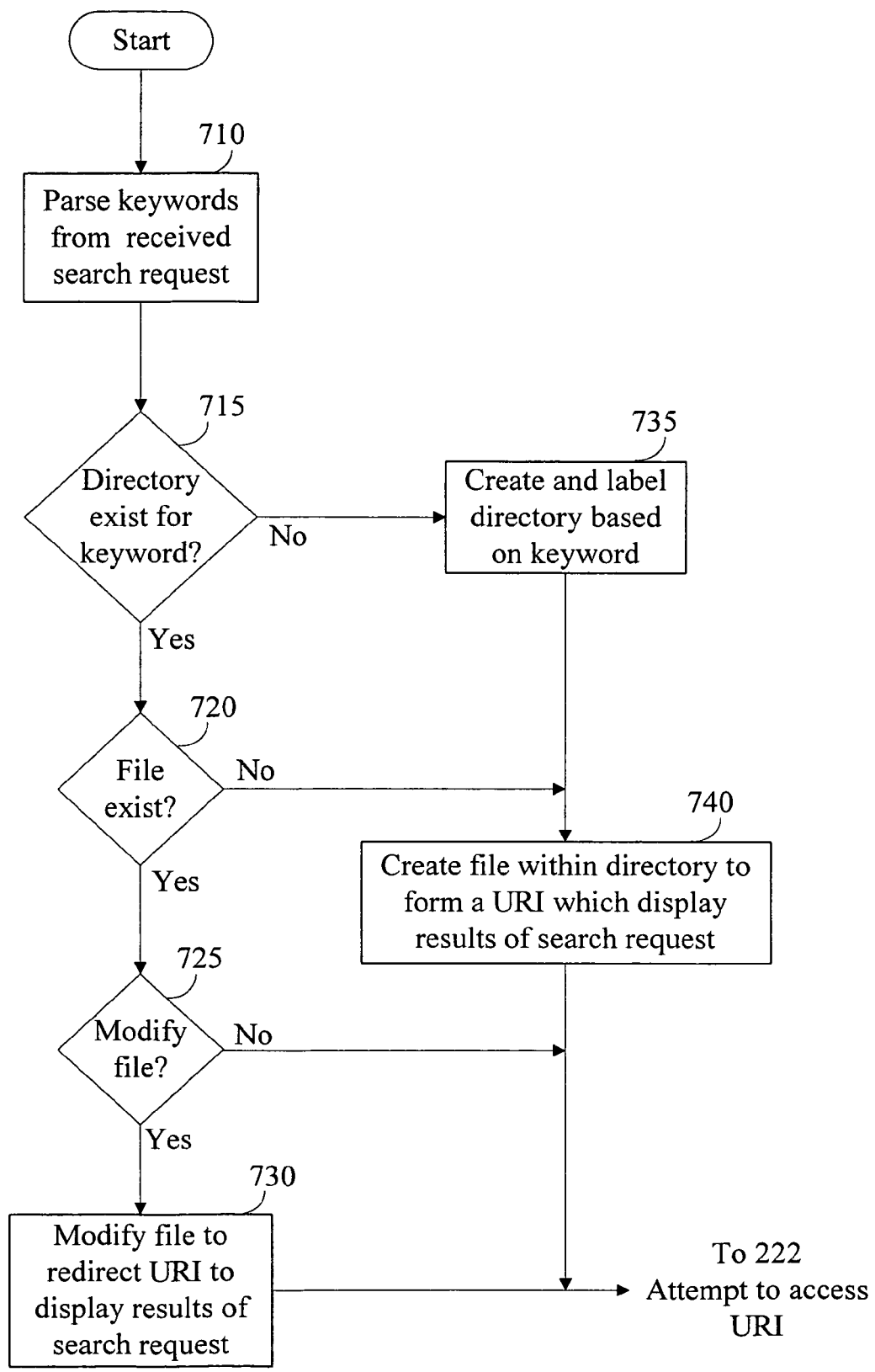
FIG. 7 is a flowchart illustrating the steps performed for generated an accessible URI based upon a search request in accordance with the present invention.

FIG. 7 is a flowchart illustrating the steps performed for generated an accessible URI based upon a search request. When a keyword is parsed in step 710 from a received search request, it then may be determined in step 715 whether a directory exists for the keyword. If the directory exists then it may further be determined in step 720 whether a file exists within the directory. If a file exists then it may be determined in step 725 whether the content of the file requires modification. If modification is needed then the content of the file may be modified in step 730 as necessary. If the directory does not exist then a directory may be created in step 735. When the directory is created or when the directory exists but a file within the directory does not exist, a file within the directory may be created in step 740 forming a URI that accesses results of the search request. When it is determined that the file already exists in step 720 and does not need modification in step 725 or the file is created in step 740 or the existing file is modified in step 735, then an attempt may be made in step 220 to access the URI.

For example, the home page of a website "http://update.to/index.htm" may provide an input text box that is used as a search request front end to pass variables to a CGI script. When the word "news" is entered and submitted as an input search request, the URI "http://update.to/cgi-bin/update.cgi?search=news" is generated. Before accessing the URI a script may be executed to determine whether a directory called "news" exists on the server "update.to". When it is determined that a "news" directory does not exist, then the directory may be created. Furthermore, a file called "index.htm" is created in the "news" directory to generate the URI "http://update.to/news/index.htm". The content of the "index.htm" file may include a URI redirection, a <META> tag refresh, or a <FRAME> tag which may be used to display the content from the URI of the search request "http://update.to/cgi-bin/update.cg i?search=news".

In effect, shorter URLs are generated in real time or on-the-fly when necessary and used as a substitute or proxy for longer URLs. Though any filename may be used, it is a preferred aspect to use "index.htm" as a frame or redirect so the proxy URL is even shorter in string length. A shorter URL makes it easier for a user to remember the URL for future use. The invention is not limited to using only a FLD as a search request. Any directory or combination of directory levels may be either generated on the fly or used as a search request. In addition, to using the directory portion of a URI as a search request, a domain (e.g. SLD, 3LD) or any combination of domain levels may in turn be used to generate a query.

Analysis from major online search engines show that more than 90% of all search requests include three keywords or less. For instance, an accessible URI "http://example-.com/coffee/cream/sugar/index.htm" may be generated in response processing the search request "coffee and cream and sugar". In turn, the input "example.com/coffee/cream/sugar" may generate search results in response to processing a web address or URI as a search request. Boolean logic may be applied to extend variations of other search requests. In effect, URI notation may be used as a system to generate a Boolean search request from the URI or vice-versa. For example, the search request "coffee or cream or sugar" may yield "http://example.com/coffee.cream.sugar/index.htm"

whereas the search request "coffee or cream and sugar" may yield "http://example.com/coffee.cream/sugar/index.htm"

Another example for using a URI to reduce user steps is to make use of the correspondence between a HTTP address and an e-mail address. For instance, web pages may be generated such that on each web page there corresponds a hidden variable of an e-mail address as a means to contact the owner of the web page. This is particularly useful when the web page serves as a web based e-mail interface to contact a recipient such as a friend, co-worker, or business entity. For instance, when "http://zipit.to/president" is received as input and accessed, a web page may be displayed allowing anyone viewing the web page to compose an e-mail message without having to enter the e-mail address of the recipient. The burden of remembering or inputting and possibly misspelling the e-mail address of a recipient is eliminated because the hidden variable "mailto: president@zipit.to" is passed as a variable when the e-mail message is sent. After the composed e-mail is submitted from the web page, a lookup table or database may be used to further redirect the e-mail to a final destination designated by the recipient. In effect, e-mail may be delivered by using protocols other than the "mailto:" protocol.

Figure 8:
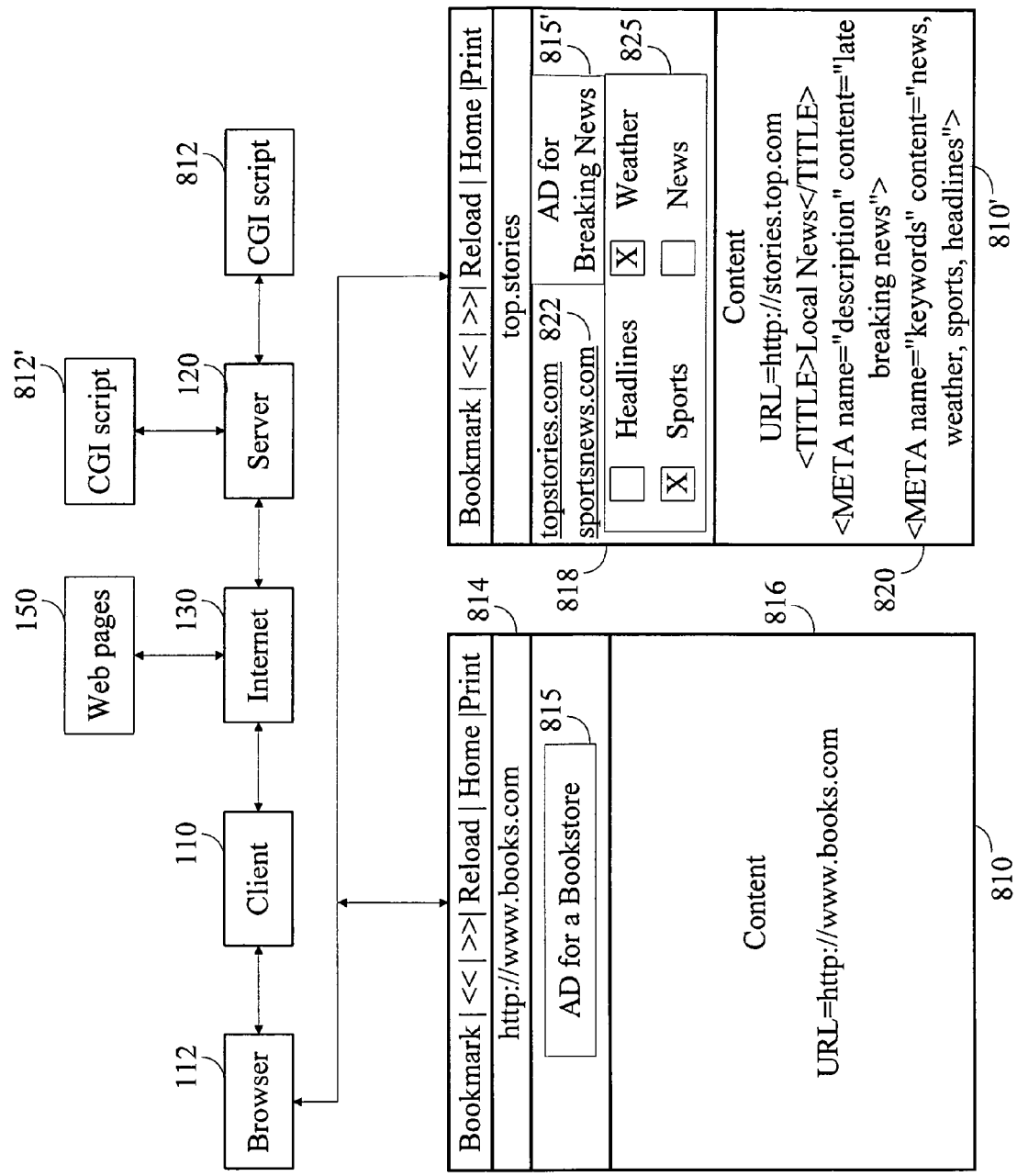
FIG. 8 is a diagram depicting how results may be displayed in a web browser in accordance with the present invention.

FIG. 8 is a diagram depicting how results may be displayed in a web browser in accordance with the present invention. A client 110 web browser 112 having a web page 810 is used to connect to a server 120 via the Internet 130 that executes a CGI script 812. The location field of the web browser 112 is suppressed and the web page 810 displays at least two frames. The first frame is the web based location field 814 including room to rotate advertisements 815 and the second frame 816 may be used to display the content 150 of a web address. An input device 170 (e.g., keyboard, mouse, pen light, touch screen, or microphone etc.) of a client computer or network access apparatus 110 is typically used to receive a web address as input directly from a hyperlink (not shown) in the web page 810, or from the location field 814 of the web page 810.

A HTTP GET request may be generated from input and the browser 112 forwards the request to a server 120, which processes the request by executing a CGI script 812 to extract URI components for ad selection. A first URI 206 may be generated to receive a selected ad 815 for display and refresh the web based location field 814 when accessed by the first frame. The content 150 of the URI generated from the input may be displayed in the second frame 816 of the web page 810 when accessed. The location field 814 of the first frame may either persist by displaying the input or may be cleared out for entry of the next web address. Both the first URI and second URI may be generated as frames and displayed as a web page 810 by the CGI script 812.

Another web page 810' (as discussed in FIG. 5b) having a location field that is suppressed may be displayed by using a different CGI script 812'. The first frame 818 is the web based location field 814 including room to rotate advertisements 815' and display suggested keywords, available domain names 822, or search terms 825 to assist a user in selecting a more specific search.

The second frame 820 may be used to display the content 150 of a web address. A URI GET request may be generated from input, and the browser 112 may forward the request to a server 120, which processes the request by executing a CGI script 812 to determine validity of the input.

An accessible URI is generated from the input and then a URI HEAD request may obtain and extract header information from the accessible URI to determine what advertisement 815' and/or keywords 825 may be generated and displayed in the first frame 818 of the web page 810' whereas the content of the second frame 820 is the content of the URI. Both the first URI and second URI may be generated as frames and displayed as a web page 810' by the CGI script 812'.

Though the above aspects demonstrate how URIs may be accessed based upon a web-based version of a location field, similar teachings may be applied to those skilled in the art by providing a user interface element such as a text box object as input. The text box object may be located anywhere and on any web page including a text box that may be embedded or displayed as part of an on-line advertisement. The text box object may be used in a stand-alone application or stored on magnetic and/or optical media that may be non-volatile, writable, removable, or portable. The text box object may be incorporated as an applet or servlet and embedded in other applications. The text box may be integrated in the taskbar or any part of the GUI's OS, or the OS bypassed and a user interface element overlaid as a graphic on a display device based on modifications to a video card and/or it's associated firmware or software drivers. A command line text box may be further overlaid as an interactive object in other embodiments such as Internet television, cable television, digital television, or interactive television through an Internet appliance or set top box.

Those skilled in the art may make and use software program that functions as a browser plug-in. Such a program may be downloaded and installed for integration into the command line of a device or location field 154 of a browser program 112. Modifying the source code of the browser program 112 itself may be more desirable, in effect, enabling tens of millions of users to take advantage of more creative ways to use input as a means to access a valid URI. In addition, advertising banner ads may be displayed directly as part of the GUI for the client browser 112 rather than limited to web page based banner ad displayed in a frame as discussed in FIG. 8.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A method for a user retrieving a web page from a network comprising:
   determining that the web page can be accessed from the network with a resource location request including a Uniform Resource Identifier (URI) having one or more URI components;
   generating one or more domain names from at least one of a one or more URI components and at least a portion of the web page; and,
   providing the user with the web page from the network and providing the user with an ability to determine whether at least one domain name of said one or more domain names is available for registration.

2. The method, as set forth in claim 1, wherein said generating said one or more domain names from said at least a portion of the web page includes receiving markup language from the web page, said markup language including head information.

3. The method, as set forth in claim 2, wherein said markup language is one of a HTML, DHTML, XML, XHTML, and SGML.

4. The method, as set forth in claim 2, wherein said head information includes at least one of a title information and meta information.

5. The method, as set forth in claim 2, wherein said receiving said markup language from the web page includes retrieving said at least a portion of the web page with at least one of a HTTP HEAD request and HTTP GET request.

6. The method, as set forth in claim 1, further including selecting one or more advertisements corresponding to at least one of a one or more domain names, one or more URI components, and at least a portion of the web page.

7. The method, as set forth in claim 6, wherein said one or more advertisements is selected from at least one table of advertisements.

8. The method, as set forth in claim 7, wherein said at least one table of advertisements is organized by one or more groups and categories.

9. The method, as set forth in claim 7, wherein said at least one table of advertisements can be accessed from an advertisement cache.

10. The method, as set forth in claim 6, wherein a first entity manages the web page and said one or more advertisements correspond to a second entity that represents business competition to said first entity.

11. The method, as set forth in claim 1, wherein said at least one domain name is generated from at least one keyword extracted from said at least one of a one or more URI components and at least a portion of the web page.

12. The method, as set forth in claim 1, further including generating one or more keywords and search terms used to assist the user with performing an internet search engine request corresponding to at least one of a one or more domain names, one or more URI components, and at least a portion of the web page.

13. The method, as set forth in claim 12, further including providing the user with an ability to request an internet search engine request from said one of a one or more keywords and search terms.

14. A computer program product comprising computer readable program code stored on a computer readable medium, the program code adapted to execute a method for a user requesting a web page from a network including determining that the web page can be accessed from the network with a resource location request including a Uniform Resource Identifier (URI) having at least one URI component, generating one or more domain names from at least one of a one or more URI components and at least a portion of the web page, and providing the user with the web page from the network and providing the user with an ability to determine whether at least one domain name of said one or more domain names is available for registration.

15. A method for a user requesting a web page from a network comprising:
   determining that the web page can be accessed from the network with a resource location request including a Uniform Resource Identifier (URI) having one or more URI components;
   at least one of a generating one or more domain names from said one or more URI components and selecting one or more advertisements from said one or more URI components; and,
   providing the user with the web page from the network and providing the user with an ability to at least one of a determine whether at least one domain name of said one or more domain names is available for registration and view at least one advertisement of said one or more advertisements.

16. The method, as set forth in claim 15, wherein said one or more advertisements is selected from at least one table of advertisements.

17. The method, as set forth in claim 15, wherein said at least one table of advertisements is organized by one or more groups and categories.

18. The method, as set forth in claim 16, wherein said at least one table of advertisements can be accessed from an advertisement cache.

19. The method, as set forth in claim 16, wherein a first entity manages the web page and said one or more advertisements correspond to a second entity that represents business competition to said first entity.

20. The method, as set forth in claim 15, wherein said one or more domain names are generated from at least one keyword extracted from said one or more URI components.

* * * * *